June 25, 1935. G. V. SWEARINGEN 2,006,331
VESSEL LINING
Filed Sept. 7, 1932 2 Sheets-Sheet 1
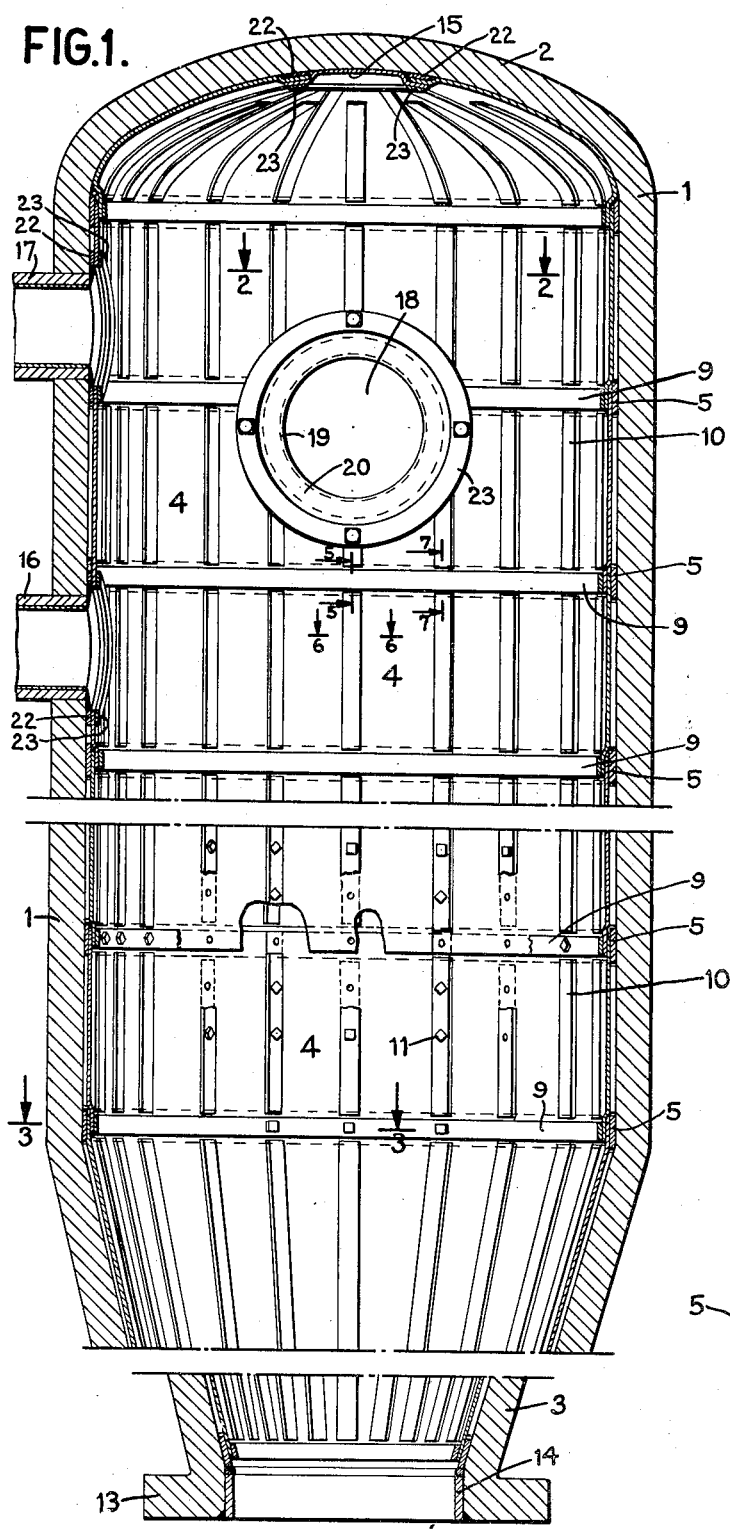
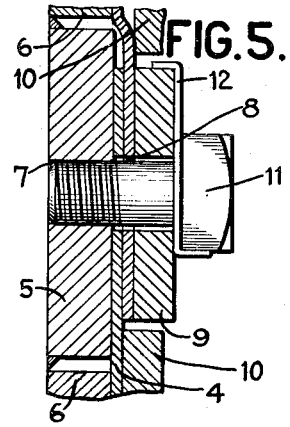
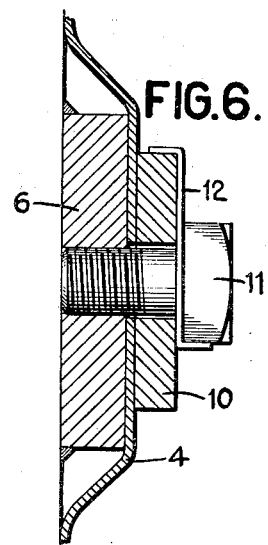
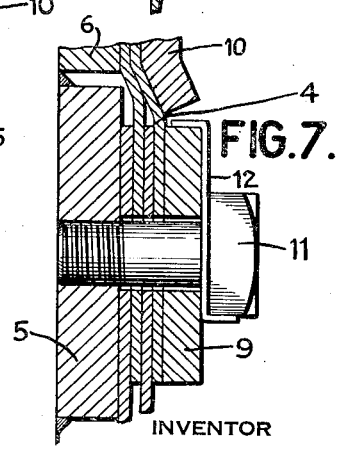
INVENTOR
Garrett V. Swearingen
BY
Donald H. Mace
ATTORNEY June 25, 1935.  G. V. SWEARINGEN  2,006,331
VESSEL LINING
Filed Sept. 7, 1932  2 Sheets-Sheet 2
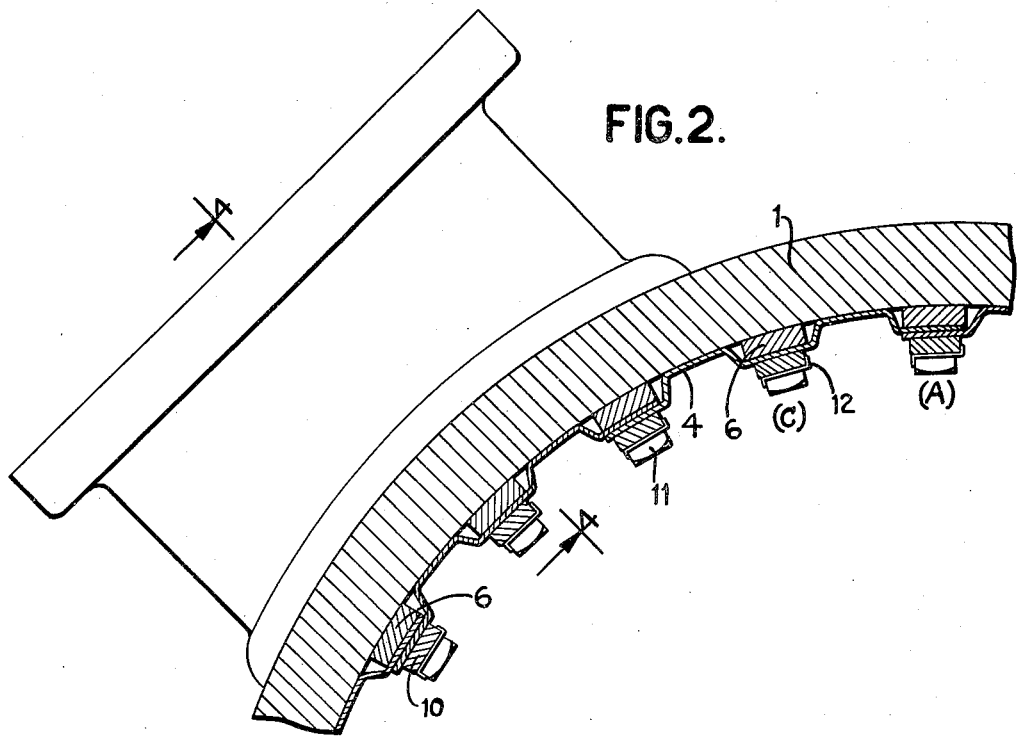
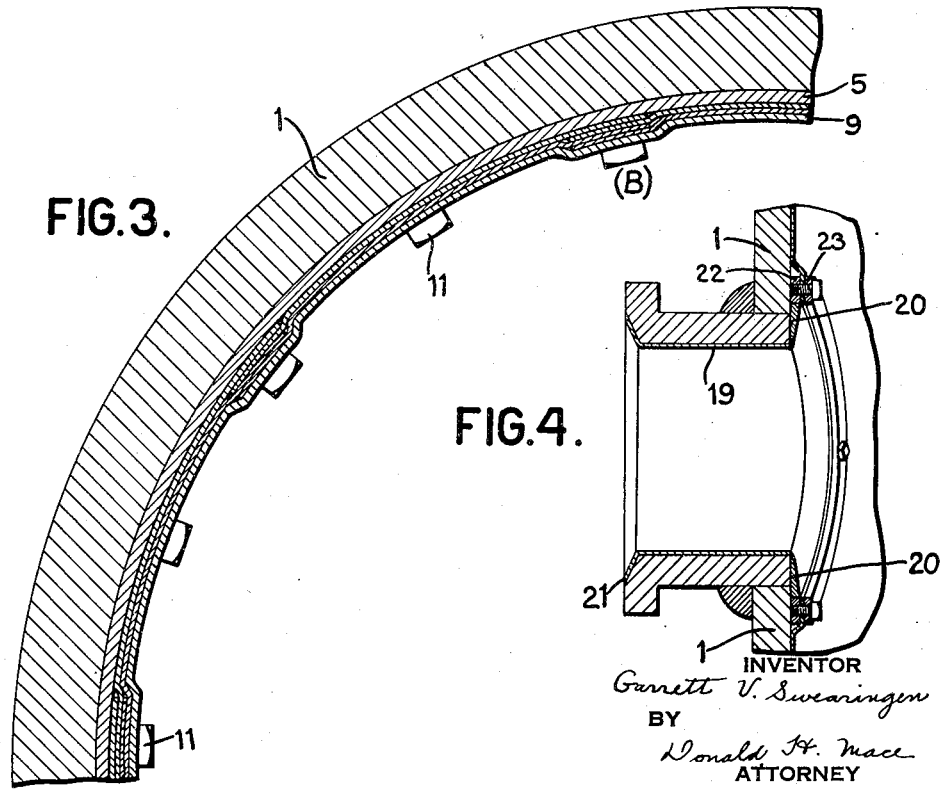
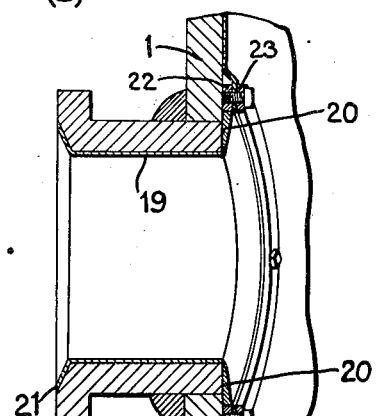
INVENTOR
Garrett V. Swearingen
BY
Donald H. Mace
ATTORNEY Patented June 25, 1935

2,006,331

UNITED STATES PATENT OFFICE 2,006,331

VESSEL LINING

Garrett V. Swearingen, Port Arthur, Tex., assignor to The Texas Company, New York, N. Y., a corporation of Delaware Application September 7, 1932, Seial No. 631,972

4 Claims. (Cl. 220—63)

This invention relates in general to lining the interior of vessels and more specifically to the lining of the interior of vessels with corrosion resistant material.

Ordinary steel vessels used in the treatment of corrosive substances are gradually corroded and after a period of use the corrosion becomes so marked that future use thereof would be unsafe. Generally these vessels are scrapped, although if some expedient to prevent future corrosion was employed it would be possible to safely operate them under the required temperature and pressure conditions in a particular process for a considerably longer period of time.

In the treatment of hydrocarbon oils, for instance, the corrosive substances present and/or evolved during treatment greatly corrode the surfaces which they contact to such an extent that extra metal generally provided for this purpose is destroyed. As high temperatures and pressures are generally employed in the conversion of hydrocarbon oils, future operation of the corroded vessel, with the resultant additional corrosion, would be unsafe.

My invention is particularly well adapted to lining the interior of a vessel which has been corroded but which has sufficient strength to be operated safely provided a remedial expedient is employed to prevent future corrosion. My invention may be applied to a new vessel as will obviously hereinafter appear.

An object of my invention is to provide sectional corrosive-resistant lining attached to a framework within the vessel.

Another object of my invention is to provide a corrosive-resistant lining made up of a plurality of sections joined together and fastened to a framework so as to permit certain expansion and contraction independent of the vessel.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In accordance with my invention, any type of vessel, such as a still or a bubble tower used in the conversion of hydrocarbon oils, is interiorly cleaned by sand blasting or the like, if the vessel has been previously used, to remove all deposits and foreign matter therefrom. Suitable bars are welded to the cleaned surface to form a framework for attaching a plurality of overlapping sections, each of which is formed to correspond to the shape formed by that portion of the framework to which it is attached. The number of sections of the corrosive-resistant material will depend upon the size of the vessel and the size of the opening through which the sections are inserted.

In order to make my invention more clearly understood, I have shown in the accompanying drawings, means for carrying the same into practical effect without limiting the improvements in their useful applications to the particular constructions which, for the purpose of explanation, have been made the subject of illustration.

Figure 1 is an elevational view, in section, of a vessel lined in accordance with my invention.

Figure 2 is a sectional view taken along line 2—2 of Figure 1.

Figure 3 is a sectional view taken along line 3—3 of Figure 1.

Figure 4 is a sectional view taken along line 4—4 of Figure 2.

Figure 5 is an enlarged detail view showing the fastening of two overlapping sections of the lining to the framework taken along line 5—5.

Figure 6 is an enlarged detail view showing the fastening of each section of the lining along a central longitudinal portion thereof to the framework taken along line 6—6.

Figure 7 is an enlarged detail view showing the fastening of four overlapping sections of the lining to the framework taken along line 7—7.

Referring to the various figures in the drawings wherein the same reference characters designate like parts throughout and more particularly to Figure 1, there is shown a vessel having a shell 1 of carbon steel or any other suitable metal or alloy. The shell 1 may be formed in any desired shape and, as shown, is curved at the top to form a convex end or dome 2 and tapered at the lower portion to form a tapering portion 3. The section of the vessel between the dome 2 and the tapering portion 3 is of a cylindrical shape.

While a particular shaped vessel has been shown, this is for illustrative purposes only, as my invention is not limited to any shape. Moreover, the vessel may be positioned in any desired position, a vertical one being shown for convenience.

My invention comprehends the provision of an interior lining comprising a plurality of sections 4 of corrosive resistant material. The material may be a metal in sheet form and in the preferred embodiment may be sheet steel or iron of comparatively high chromium content. The chromium content of such an alloy will vary from 12% to 16%, although it is to be understood that a higher or lower chromium content may be used, if desired.

The necessity of welding the corrosive resistant lining to the interior of the vessel is obviated in practicing my invention. Instead of welding the corrosive resistant lining to the shell 1, I have provided a suitable framework for securing the various sections thereto. As shown, a plurality of metal bars 5 extend around the interior of the shell 1 and may be suitably tack welded thereto at any desired number of points. The bars 5 may be evenly spaced within the cylindrical portion of the vessel and the number of rows of bars depends upon the longitudinal dimension of the cylindrical portion and the desired length of each section of lining. If longer or shorter sections of lining are desired, the distance betwen each circumferential bar 5 may be varied accordingly. The bars 5 may be made up of a plurality of arcuate sections, preferably shaped to conform to the interior curvature of the vessel before being inserted. The end of each arcuate section may be suitably welded to the adjacent end of another section at the formed joint, thereby providing a continuous circular bar extending circumferentially of the interior of the vessel.

A plurality of longitudinal bars or battens 6 are likewise tack welded to the shell 1 to form the framework for securing the sections 4. As shown, the battens 6 do not cross over the bars 5 as otherwise an uneven surface for the framework would result. Each batten is of a sufficient length to fit between any two of the circumferential rows 5 to form a framework. The segmental distance between the strips of battens 6 to which the edges of each section are attached depends upon the size of the opening through which the sections 4 are inserted and the width of each section is only limited thereby. As will be later explained, there is provided an intermediate batten strip between the strips of battens to which the edges of each section 4 are attached.

The strips of battens 6 for the tapering portion 3 and the dome 2 converge towards a point at each end in order to conform to the particular shape at the two ends of the vessel. Consequently the sections 4 of the lining are shaped corresponding to the particular shape formed by the converging strips and are secured thereto in a manner to be hereinafter described.

The circumferential rows 5 and the strips of battens 6 forming the framework may be of the same metal as the shell 1. By this selection, the framework may be easily welded to the vessel, by electrical or other methods, and have the same coefficient of expansion as the shell, thereby avoiding any tendency of the framework from expanding or contracting unevenly with respect thereto.

As is clearly shown in the last three figures, each corrosive resistant section 4 is formed so as to provide a raised surface around its edges to rest upon the framework. The sections are then tapered towards the vessel shell and are shaped so as to rest adjacent to the interior of the shell 1. Along an intermediate longitudinal line of each section an additonal raised surface is provided, as shown in Figure 6 to rest upon the intermediate strips of battens.

The circumferential rows 5 and the strips of battens 6 including the intermediate strips, are provided with a plurality of suitably spaced internally threaded holes 7. A corresponding number of holes 8 are spotted in the raised surface along the edges of the lining sections and along the intermediate longitudinal line for the purpose of securing them to the framework. As illustrated, the raised edges of adjacent sections of the lining overlap and rest upon the framework. The holes 8 are in alignment with the threaded holes 7 in the framework when the sections 4 are placed in position within the shell 1.

A plurality of bars 9, each of which may be made up of arcuate sections in a manner similar to the circumferential rows 5 are positioned upon the overlapping apertured ends of the sections 4 and extend circumferentially around the interior of the vessel. A plurality of bars 10, extending longitudinally of the vessel, are positioned upon the overlapping apertured sides and the intermediate longitudinal portions of the sections 4. Each bar 10 is of sufficient length to fit in between any two of the circumferential rows of bars 9 and does not cross thereover, as has been described, in connection with the longitudinal bars or battens 6. The number of bars 9 and 10 corresponds to the number of bars 5 and 6 forming the framework and are correspondingly apertured.

In order to maintain the corrosive resistant sections 4 and the bars 9 and 10 in position, a plurality of cap screws 11 are passed through the apertures in each and screwed into the internally threaded holes 7. Before securing the various parts together, a lockwasher 12 may be placed between the bars 9 and 10 and the head of each cap screw 11 in order to provide a fluid tight seal. As will be noted, each lockwasher is bent over the bars at one end and over the head of the cap screw at the other end. It is apparent that the particular fitting arrangement shown provides a secure connection for the lining sections to the shell framework and furthermore prevents seepage of fluid through the lining to the vessel. The bars 9 and 10 may, if desired, be dispensed with, thereby permitting the head of each cap screw to be flush with the lining sections. Any suitably shaped cap screw and lockwasher, or other fastening means, may be employed, the particular means shown being merely for illustrative purposes.

In assembling the interior lining within the vessel, the various sections comprising the lining are formed into the desired size and shape and apertured before they are inserted. All edges of the various sections are securely held together, and as shown in Figure 5, where two sections overlap, they are securely held together by the fitting parts, as already described. The particular arrangement shown in this figure represents the type of connection provided when any two sections overlap, as at point A whether it be along the longitudinal or transverse edges of the overlapping sections. At the points where four sections overlap, such as B, the overlapping sections are securely held together by the fitting parts shown in Figure 7. The fitting parts shown in this figure are the same as those employed for securing two overlapping sections, with the exception that the cap screws are longer in order to compensate for the width of two additional overlapping sections.

In Figure 6 there is shown the manner in which the longitudinal center portion of each section is secured to the intermediate strips of battens. The various fitting parts for securing the center portion of each section to the shell are the same as those shown in Figures 5 and 7 with the exception that the cap screws are shorter than those shown in either of the other two figures as it is only necessary to secure one thickness of the lining to the framework. The points at which the type of connection illustrated in Figure 6 is employed are designated in the drawings at C. By securing each section of the lining along its longitudinal center portion, it is possible to hold it more securely to the vessel.

All of the fitting parts in contact with the corrosive substances, which comprise the bars 9 and 10, the cap screws 11 and the lockwashers 12 may be made from any suitable corrosive-resistant metal or alloy. The metal may be predominately of iron or steel and containing 12% to 16% of chromium although other percentages of chromium and other metals may be employed. By fastening the sections 4 in the manner described, they may expand and contract to a certain extent independently of the vessel.

The lower end of the tapering portion 3 is provided with a manway 13, with a ring 14 of suitable corrosive-resistant metal extending to the circumferential row 5 adjacent the manway. The ring 14 may be suitably welded to the adjacent circumferential row 5 and the metal surrounding the manway opening. At the top of the vessel there may be provided an opening (not shown) for a vapor outlet or in lieu thereof a circular plate 15 of corrosion-resistant metal which may be secured to the center of the dome 2 in the manner hereinafter described. The longitudinal batten strips 6 to which the overlapping sections 4 are attached, extend to the edge of the circular plate and may be tack welded at suitable points along the interior of the dome. The intermediate batten strips for securing the middle longitudinal portion of the lining sections may, if desired, only extend part way of the dome 2. The lining sections for both the tapering portion 3 and the dome 2 are shaped to conform to the particular shape of the framework to which each section is attached. As shown, the flaring end of each section overlaps the adjacent lining section and is secured to the framework. The tapering end of each section for the portion 3 is surrounded by the circumferential row 5 at the bottom thereof and secured as before described. The tapering end of each section for the dome 2 extends to the edge of the circular plate 15 which preferably overlaps said sections, and may be secured about the periphery thereof as hereinafter described. Preferably the corrosive-resistant sections 4 extend the entire length of the tapering portion 3 and the dome 2, obviating the necessity of placing intermediate circumferential rows. When the lining sections are attached to the framework in the manner described, an impervious surface is provided. This invention provides a positive anchoring of the relatively thin lining sections and due to the particular arrangement employed, certain expansion and contraction independent of the wall of the vessel is permitted.

Pipe connections 16 and 17 enter the upper portion of the vessel. The pipe 16 may be used as the liquid passage when a series of vessels are connected together as for example to act as a conversion zone in the cracking of hydrocarbon oils. The pipe 17 may be used in such a system as the vapor passage. A second manway 18 is also shown for allowing easy access to the upper portion of the vessel. While I have shown certain pipe connections and manways for the particular vessel illustrated, it is to be clearly understood that my invention is not limited to lining a vessel arranged in such a manner as obviously the number of openings may be varied depending upon the particular operation being carried out. A lining is provided for the pipe connections 16 and 17 and the manway 18. Referring to Figure 4, there is shown a lining for the manway 18. The lining comprises a thimble or sleeve 19 of corrosive resistant metal suitably welded to the shell 1, as at 20. The outer end of the sleeve 19 may be flared and welded to the neck of the manway, as at 21. The pipe connections 16 and 17 are lined with a corrosive resistant metal in a similar manner, with a sleeve extending from one vessel to another and welded to the shell at each end thereof. The sections of lining adapted to surround the various openings in the shell have portions corresponding to the size of the openings removed before being inserted in the vessel. Circular bars 22 and 23 are provided, Figure 4, to complete the framework and for securing the lining sections about the periphery of said openings, and any gaps or exposed surfaces remaining intermediate the lining and said openings may be covered over by the ring of welding material employed to secure the lining for said openings and which welding material may be corrosive resistant. Similar members 22 and 23 are provided for securing the circular plate 15 and the tapering ends of the sections 4.

The linings for the manways and pipe connections may be made from a corrosive resistant metal alloy commonly known as "stainless steel". This alloy contains approximately 18% chromium and 8% nickel and is more readily welded to the carbon steel of the shell than an alloy containing 12% to 16% chromium. It is to be understood that my invention is not limited to a particular corrosive resistant material for any part of the vessel, as it broadly comprehends the provision of a lining resistant to the action of corrosive substances. It is preferred to use an alloy containing from 12% to 16% chromium for the lining sections 4 as this alloy has less coefficient of expansion than "stainless steel" and very little more than carbon steel.

While my invention has been described as lining an entire vessel, only a portion thereof may be lined without departing from the spirit thereof. In the treatment of hydrocarbon oils, for example, the portion of the vessel subjected to hydrocarbon vapors is more rapidly deteriorated than the portion containing the liquid. It is within the scope of my invention, therefore, to line only the vapor portion of the vessel.

From the foregoing it will be readily seen that I have provided a sectional lining for a vessel that comprises a continuous lining made up of sections and joined together in such a manner as to prevent leakage through the joints. There is also provided by this invention a sectional lining installed in such a manner that one or more of the individual sections may be removed without removing the remainder of the lining.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a vessel, an interior lining therefor comprising a plurality of overlapping corrosive-resistant sections, a framework attached to the interior of said vessel and means for securing the overlapping portions of the corrosive-resistant sections to the framework and permitting expansion and contraction thereof.

2. In a vessel, an interior lining therefor comprising a plurality of corrosive-resistant sections, each section having a raised portion extending around its edges and a raised portion extending longitudinally through the center thereof, a framework attached to said vessel comprising a plurality of circumferential and longitudinal bars of metal and intermediate bars extending longitudinally between the longitudinal bars and means for securing the raised portions of the corrosive-resistant sections to the bars forming the framework so that the sections will be securely held together.

3. In a vessel, an interior lining therefor comprising a plurality of corrosive-resistant sections, each section having a raised portion extending around its edges and a raised portion extending longitudinally through the center thereof, the raised portions along the edges of each section overlapping the adjacent raised portions of other sections, a framework attached to said vessel comprising a plurality of circumferential and longitudinal bars of metal and intermediate bars extending longitudinally between the longitudinal bars, a plurality of bars corresponding to the circumferential, longitudinal and intermediate bars positioned above same, each of the circumferential and longitudinal bars resting upon the overlapping edges of each section and means for securing the sections and the bars to the framework.

4. In a vessel, an interior lining therefor comprising a plurality of corrosive resistant sections, each section having a raised portion extending around its edges and a raised portion extending longitudinally through the center thereof, the raised portions along the edges of each section overlapping the adjacent raised portions of other sections, a framework attached to said vessel comprising a plurality of circumferential and longitudinal bars of metal and intermediate bars extending longitudinal between the longitudinal bars, a plurality of bars corresponding to the circumferential, longitudinal and intermediate bars positioned above same, each of the circumferential and longitudinal bars resting upon the overlapping edges of each section, a plurality of cap screws for securing the sections and the bars together and a plurality of lock washers between the head of each cap screw and the bars positioned above the lining sections.

GARRETT V. SWEARINGEN